G. T. COOLEY.
JIG FOR ORE DRESSING.
APPLICATION FILED NOV. 19, 1918.
1,334,841.
Patented Mar. 23, 1920.
4 SHEETS—SHEET 1.
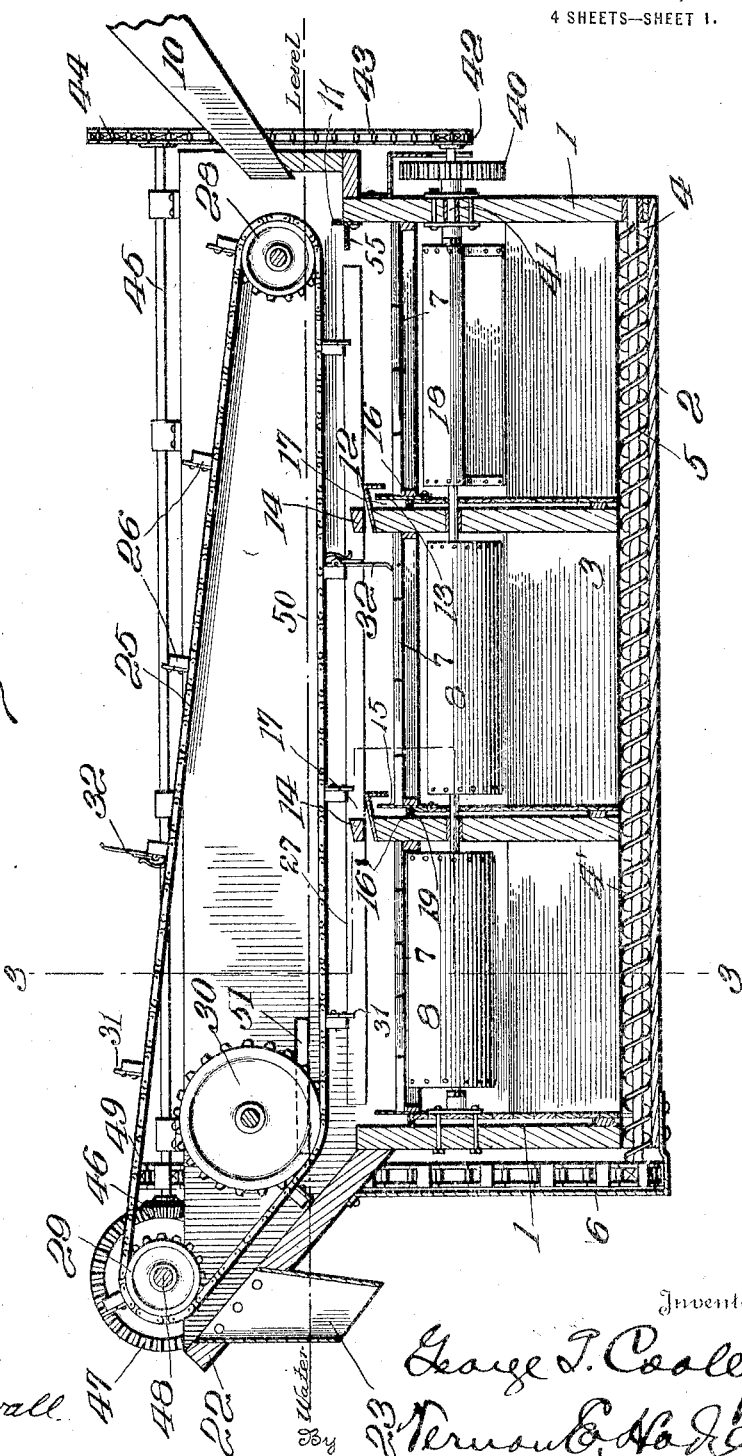

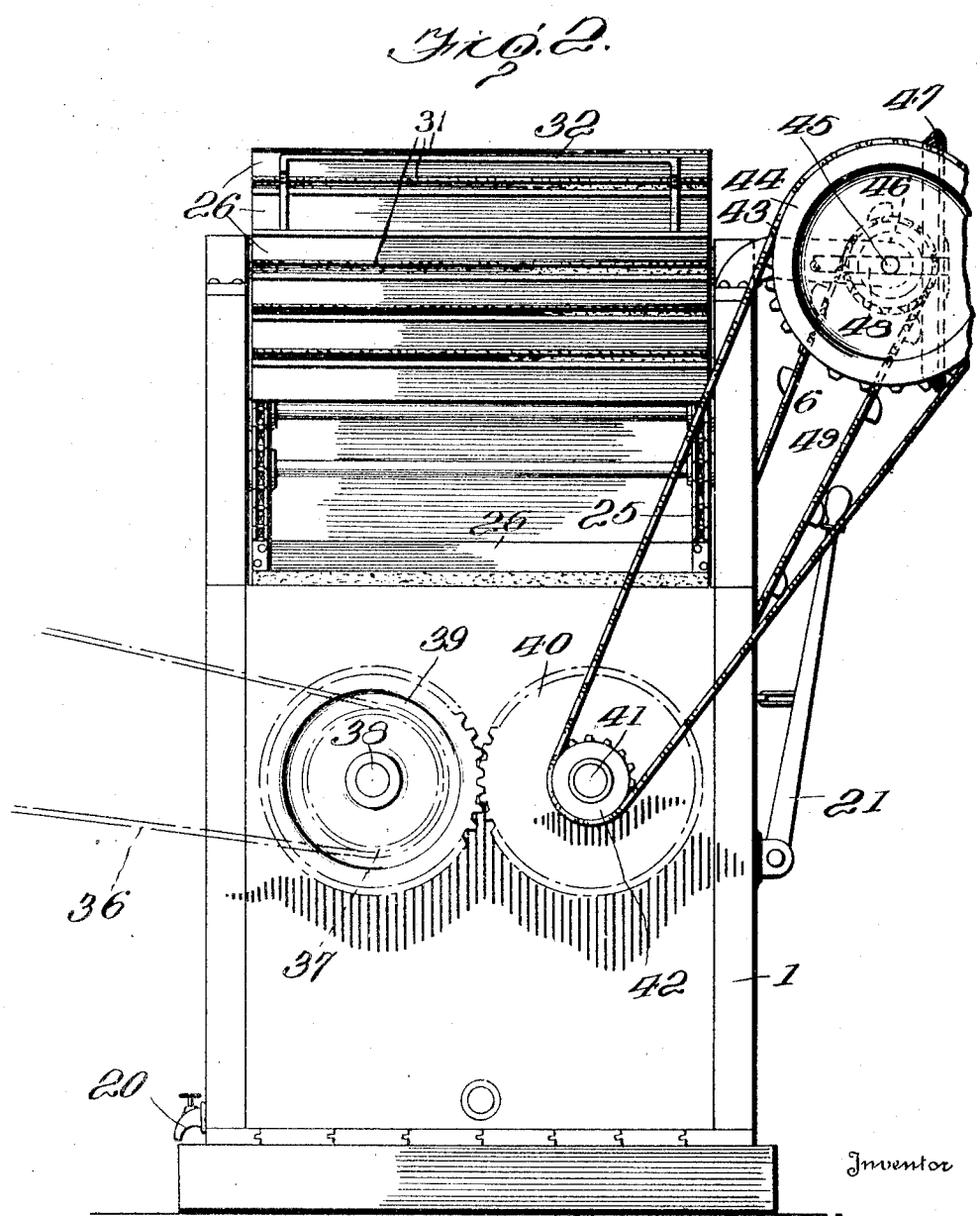

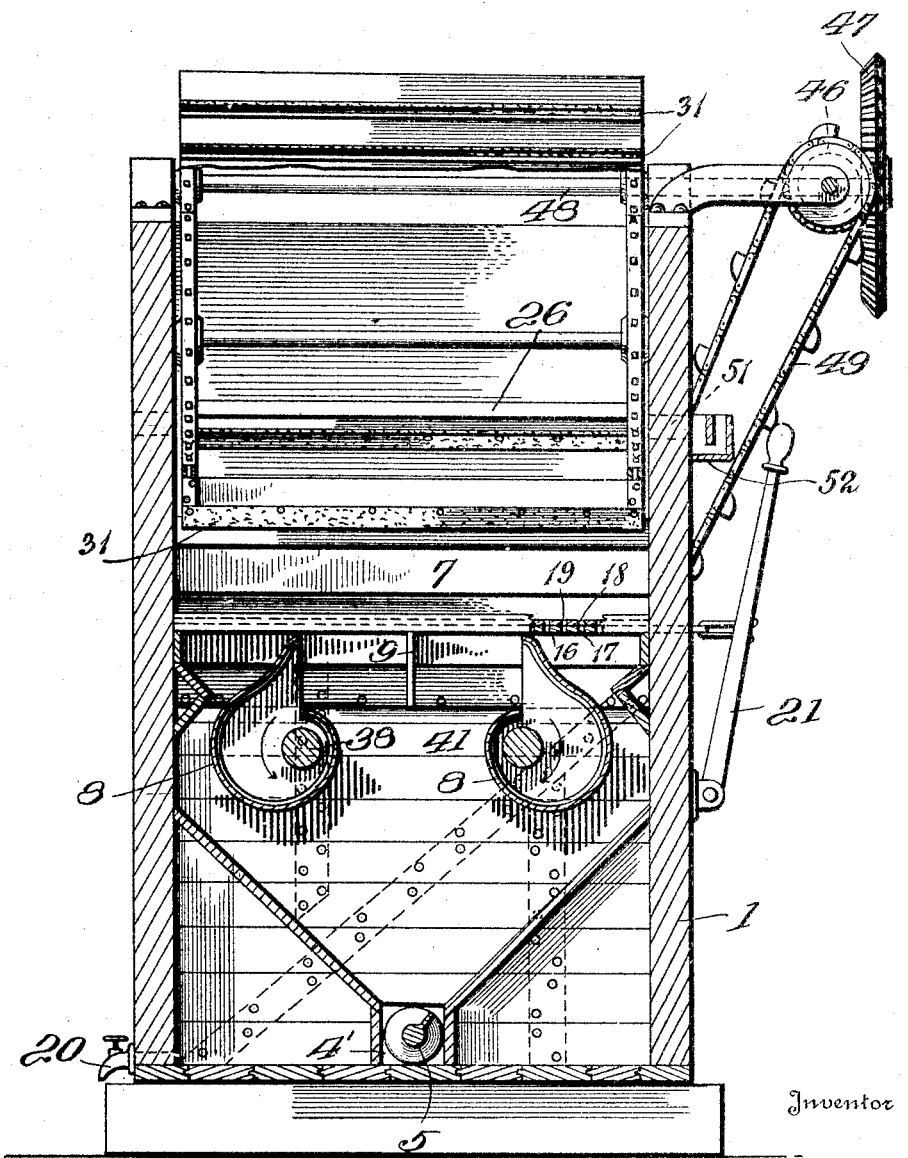

G. T. COOLEY.
JIG FOR ORE DRESSING.
APPLICATION FILED NOV. 19, 1918.
1,334,841.
Patented Mar. 23, 1920.
4 SHEETS—SHEET 4.
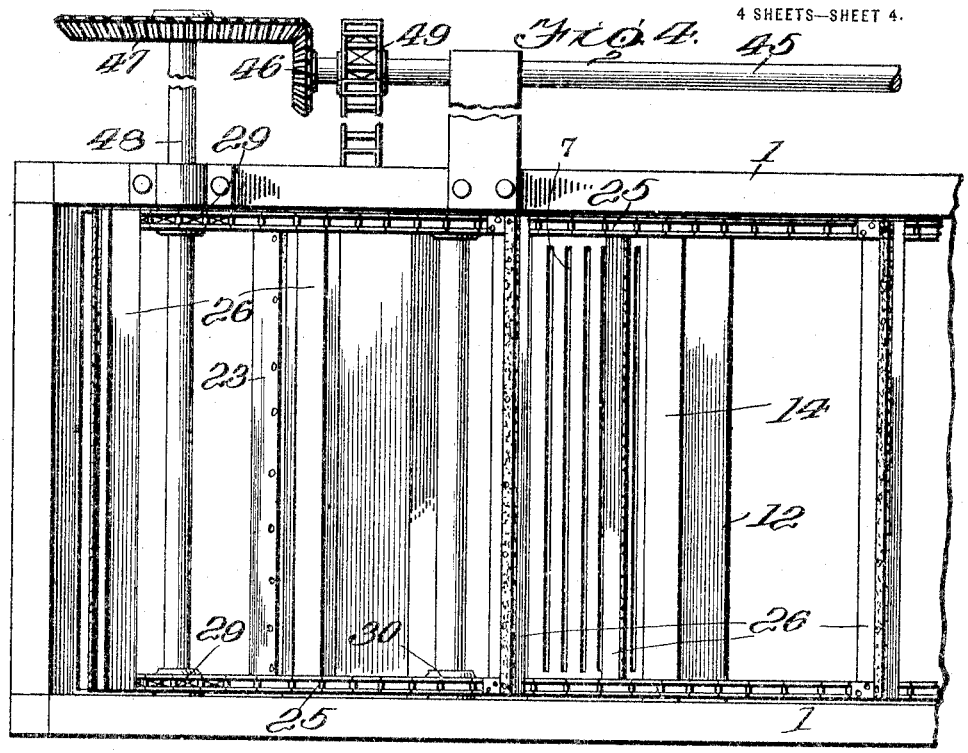
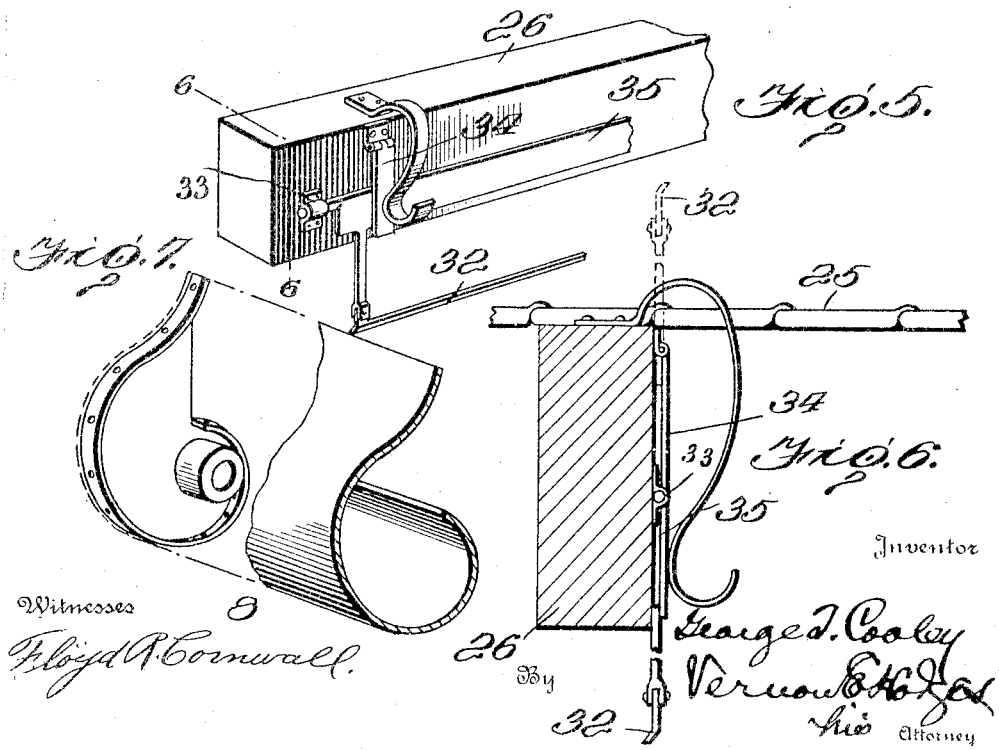

UNITED STATES PATENT OFFICE.

GEORGE T. COOLEY, OF JOPLIN, MISSOURI.

JIG FOR ORE-DRESSING.

1,334,841.　　　Specification of Letters Patent.　　Patented Mar. 23, 1920.

Application filed November 19, 1918. Serial No. 263,186.

*To all whom it may concern:*

Be it known that I, GEORGE T. COOLEY, a citizen of the United States, residing at Joplin, in the county of Jasper and State of Missouri, have invented certain new and useful Improvements in Jigs for Ore-Dressing, of which the following is a specification.

My invention relates to jigs for ore dressing.

One of the primary objects is to provide a machine of approximately double the capacity, and which will require about one-fourth of the amount of water, and in the neighborhood of one-third the power in its operation, of the ordinary plunger type of jig.

Another important object is the provision of means for the automatic regulation of the ore bed to maintain a uniform level in the various sections throughout to cause the water to stratify more evenly by keeping the bed in one position and allowing the water to flow through grates or sieves, and further to provide for the automatic spudding of the beds at predetermined intervals without undue agitation of the constituent parts of the bed.

Still a further object is to provide an endless drag-line which automatically discharges the tailings from the surface of the beds, causing them to become de-watered before they are finally discharged from the machine.

Still a further object is to cause the preservation of all slimes by providing a horizontal jig in which the several sections are on the same level, thus precluding any current due to gravity while insuring a backward flow or return of all slimes and floating material to the first section for retreatment until they reach the point or condition of submergence.

There is yet another object, which is the provision of a jig in which the entire level is lower than others heretofore used, because of the several sections being on the same level, whereas in common practice there is a drop of several inches from one jig section to the next.

Again, in the present invention, it is possible to do away with all line shafts and eccentrics which have been a source of constant danger to human life. Again the present invention contemplates an adaptation of my improved mechanism to jigs of the old plunger type by retaining the old plungers and omitting my improved rotary agitators and applying the remaining parts of my mechanism to the old type of jig.

In the accompanying drawings:—

Figure 1 is a vertical longitudinal sectional view through the entire machine, the discharge end showing that a portion is broken out;

Fig. 2 is a view in elevation looking into the feed end of the jig;

Fig. 3 is a vertical transverse section on line 3—3 of Fig. 1;

Fig. 4 is a portion of the jig in plan, the remaining portion broken away;

Fig. 5 is a fragmentary view in perspective of one of the automatic scrapers;

Fig. 6 is an enlarged end view of the same showing the two adjustments, one in full, and the other in dotted, lines;

Fig. 7 is a fragmentary perspective of one of the rotary agitators.

The numeral 1 represents the framework of my improved jig, which in general form and dimensions is not unlike other types of jigs. It is divided into several sections as heretofore, of which I have shown three, designated by the numerals 2, 3 and 4, counting from the feed toward the discharge end, as shown in Fig. 1. These sections differ, however, from the Hartz type of jig in occupying the entire transverse space of the machine, instead of about half the space as is customary, thus giving double the capacity. Each section terminates at the bottom in the so-called "hutch" with a trough 4' at the extreme bottom, in which a screw-conveyer 5 rotates in order to conduct the concentrates by machinery to a common point of discharge at the rear end, where it is taken up by elevator buckets 6 to some convenient point.

The usual grate-bars 7 extend transversely from side to side of the machine as shown in Fig. 4, and constitute the support for the ore bed. The level of these grates is uniform throughout the machine, and while their upper surfaces are preferably about six inches in width, the distance between grate-bars is only a fraction of an inch, say about one-eighth.

Below the grate-bars, the rotary agitators 8 turn continuously, while the machine is in operation, their function being to create an upper wave of the water in the hutch due to their helical form, thereby scooping and gradually lifting a relatively large volume of the water, which, after being raised in a wave and attaining its maximum height and volume, is suddenly dropped in a cascade, thus giving it a violent upward impulse forcing it through the ore bed, and the agitators then separating, withdrawing from beneath the water, and letting it drop back, which is followed by a period of temporary rest, the agitators meanwhile gathering new force for a repetition of this action succeeding each turbulent agitation, during which time the material being treated stratifies, the fine particles dropping from the bed through the grate into the hutch below and settling in the trough 4' below. In other words, this alternate violent agitation followed by a quiescence of the water causes the ore in the bed to be stirred and permitted to stratify, and the fine particles of heavy rich ore to descend into the trough 4', whence it is removed by the screw conveyer 5, as explained.

A wave breaker or baffle-board 9 depends longitudinally beneath the center of the grate, between the two rotary agitators which cuts the wave in twain and has the added function of providing a central support for the grate, as shown in Fig. 3.

The ore and all the water used in the jig are fed into the feed end, or right-hand end of the machine through a hopper 10 (as shown in Fig. 1), an upstanding ledge 11 being provided to slightly retard the feed, and from whence the material drops over into the first section 2 of the jig and becomes distributed on the grate to form the bed.

At the discharge end of each section, an automatic draw 12 in the form of a trap is provided, and the plate 13 forming a part of this draw is vertically adjusted in accordance with the height of the richer concentrates which flow down through the draw and then over the upper edge of the plate 13, which is always adjusted to the height of the concentrates, while the chats or included grains, commonly known as middlings, pass on over the draws 12 beneath the overflows 14.

The back 15 of the automatic draw 12 is provided with a slide 16, which has holes 17 adapted to register with the holes 18 in the plate 19 below, when the slide 16 is in its inner position, whereby to let the larger concentrates through and out through the spigots 20. This slide is controlled by hand-lever 21, and, when pulled out, the holes 17 and 18 are out of registry or closed; and when forced in, they register and permit the concentrates to flow through. When the machine is operating under normal conditions, these holes are in registry or open, allowing the ore to flow through, but when starting the machine, to enable the ore beds to reach the desired predetermined or uniform height, they are kept closed, after which they are opened and kept open during the entire running of the jig.

A mechanical feeder is provided, and it has several functions:—

First, it brushes the ore from the upstanding ledge 11 onto the bed below;

Second, it constantly drags over the several beds and maintains a uniform level of ore;

Third, it scoops off the gangue and conducts it up the incline of the chute 22, causing it to drain and become dewatered on its way to the discharge spout 23, where it leaves the machine;

Fourth, it automatically spuds the grates at predetermined intervals without undue agitation to the bed; and Fifth, it creates a slight backward surface flow, which returns all slimes to the feed end of the jig.

This is accomplished by means of the sprocket-chains 25, which carry drag-lines 26, which rest upon the ledges 27 at the sides of the machine, being carried over the sprocket-wheels 28 and 29 and the idler 30. On the back of these drag-lines 26 a rubber brush 31 is secured in position to keep the fine sand from running back with the water on the inclined chute 22.

At intervals scrapers 32 are provided. These are pivoted preferably to two of the drag-lines by means of the boxes 33 (see Fig. 5), and they are actuated by the spring and plate 34, which normally holds them in their operative position (as shown in full lines in Fig. 1) in which they scrape across the grates, thus either breaking or dislodging any particles of ore caught therein and keeping them clean for the free passage of water and fine particles of ore; in other words precluding choking of the bed. While thus scraping over the surface of the grates, they, at the same time, pass beneath the bed with the least amount of disturbance thereto, their sole function being to keep the grates clean. The function of the springs 34 is to allow them to yield when they reach the automatic draws and overflows only, to pass the latter, and then resume their position against the surface of the grates.

If, in the work of any particular type of ore, these scrapers are unnecessary, they can be swung upward out of the way, as shown in dotted lines in Fig. 6, the spring in plate 34 holding them in either extreme position, due to the breadth of plate 35 to which they are secured.

The machine is driven by the belt 36 passing in the direction indicated by the arrow over the pulley 37 on shaft 38, as seen in Fig. 2. This shaft 38 carries a gear 39 which meshes with gear 40 on shaft 41. These shafts 38 and 41 carry the rotary agitators 8, as shown in Fig. 1. A sprocket-wheel 42 is secured on the feed end of shaft 41, and a sprocket-chain 43 extends therefrom to a sprocket-wheel 44 on the shaft 45 which extends throughout the length of the machine, and which is provided at its rear end with a bevel pinion 46 which meshes with the bevel gear 47 on the shaft 48, which carries the sprocket-wheels 29 which drive the drag-line sprocket-chains 25. Shaft 45 also carries a sprocket-wheel 49 over which the elevator bucket 6 is driven, and by which latter the screw-feed 5 is rotated.

The normal water level is indicated by the line 50. This, of course, might vary, but it is regulated by the overflow 51, which is in the form of a water trap 52. It is understood that in this jig no water is used, except that fed in with the pulp, and provision is made for dewatering the gangue as it is discharged from the machine, so that the entire volume of ore is dressed with a maximum amount of water, thus making it possible to use this machine when others cannot be run on account of the absence of an adequate supply of water.

It is possible to adapt the essential features of my invention to the ordinary form of plunger jig, and in so doing I place all grates on the same level instead of having them on different levels, as is customary, the rotary agitators are omitted in order to utilize the regular plungers, and the drag-line is employed for automatically maintaining the uniform top level of the bed and for mechanically removing the gangue and automatically spudding the bars.

As the operation has been explained as the description of details has proceeded, by way of recapitulation it will merely be stated that the rotary agitators and the drag-line move on continuously so long as the machine is being fed with pulp, and after the grates become once well bedded with ore, the slide in the draw-pockets is adjusted to open the outlets, after which no further adjustment is necessary, its entire action being automatic.

After the ore is once settled in the first section, it never has to pass over to another section for retreatment. In other words, the ore never requires settling a second time, as is characteristic of machines of this type now in use. In this way the capacity of my present invention is greatly increased. The bed of mineral constantly gets lower and lower, and never rises to the surface after being once settled under the gangue, whereas in machines hitherto in use this has to be done over and over again as the ore went from one section to another. The automatic spudder or scraper keeps the bed clean automatically.

The perforated shelf 55 just below the feed throws the ore toward the center and at the same time permits the water to pass up and down freely to keep the ore wet and soft.

I claim:

1. In an ore dressing machine, the combination with a hutch and screens or grates thereabove, of helical rotary agitators the helical wings of which are arranged parallel to the axis of rotation located in the hutch in close proximity to and beneath the grates.

2. In an ore dressing machine, the combination with a hutch and screens or grates thereabove, of two helical agitators rotatably supported beneath the grate, and a wave-breaker or baffle-board located beneath the grates and intermediately between the agitators.

3. In an ore dressing machine, the combination with a hutch and screens or grates thereabove, of two helical agitators rotatably supported beneath the grate, and a wave-breaker or baffle-board located beneath the grates and intermediately between the agitators and forming a central support for the grate.

4. In an ore dressing machine, the combination with a grate or sieve, of a traveling drag-line for automatically maintaining a uniform level of the ore body, said drag-line carrying scrapers of comparatively narrow width in position to scrape the surface of the grates with a minimum agitation of the ore body.

5. In an ore dressing machine, the combination with a grate or sieve, of a traveling drag-line for automatically maintaining a uniform level of the ore body, said drag-line carrying scrapers of comparatively narrow width in position to scrape the surface of the grates with a minimum agitation of the ore body, and means for permitting the scrapers to clear the overflows between sections of the machine, after which they resume their normal position at the bottom of the ore beds and upon the surface of the grates.

In testimony whereof I affix my signature.

GEORGE T. COOLEY.